(12) United States Patent
Mallik et al.

(10) Patent No.: US 8,787,183 B2
(45) Date of Patent: Jul. 22, 2014

(54) METHOD AND APPARATUS FOR CHANNEL ESTIMATION USING MULTIPLE DESCRIPTION CODES

(75) Inventors: Siddhartha Mallik, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 926 days.

(21) Appl. No.: 12/620,141

(22) Filed: Nov. 17, 2009

(65) Prior Publication Data

US 2010/0172256 A1 Jul. 8, 2010

Related U.S. Application Data

(60) Provisional application No. 61/142,826, filed on Jan. 6, 2009.

(51) Int. Cl.
*G01R 31/08* (2006.01)
*H04L 25/02* (2006.01)
*H04L 1/00* (2006.01)
*H04B 7/04* (2006.01)
*H04B 7/06* (2006.01)

(52) U.S. Cl.
CPC .......... *H04L 1/0035* (2013.01); *H04L 25/0242* (2013.01); *H04B 7/0626* (2013.01); *H04B 7/0417* (2013.01); *H04B 7/0639* (2013.01)
USPC ........................................................ 370/252

(58) Field of Classification Search
None
See application file for complete search history.

(56) References Cited

U.S. PATENT DOCUMENTS

| 2005/0060147 A1* | 3/2005 | Norimatsu et al. ........... 704/230 |
| 2007/0254602 A1 | 11/2007 | Li et al. |
| 2008/0080449 A1 | 4/2008 | Huang et al. |
| 2008/0095258 A1 | 4/2008 | She et al. |

(Continued)

FOREIGN PATENT DOCUMENTS

| CN | 1799234 A | 7/2006 |
| CN | 101291526 A | 10/2008 |
| CN | 101304300 A | 11/2008 |

(Continued)

OTHER PUBLICATIONS

International Search Report and Written Opinion—PCT/US2009/066031, International Search Authority—European Patent Office—Mar. 25, 2010.

(Continued)

*Primary Examiner* — Kibrom T Hailu
(74) *Attorney, Agent, or Firm* — Peng Zhu (57) ABSTRACT

Techniques for using multiple description codes (MDC) for channel feedback to improve channel estimation accuracy are described. A receiver may obtain an initial/measured channel vector for a communication channel. The receiver may select a codebook in a set of codebooks for quantizing the initial channel vector. Each codebook may include a different set of channel vectors/codewords. Different codebooks may be selected in different reporting intervals. The receiver may select a channel vector in the selected codebook, and the selected channel vector may have (i) a largest correlation with a normalized channel vector or (ii) a smallest distance to the initial channel vector. The receiver may send the selected channel vector and possibly the selected codebook to a transmitter. The transmitter may receive the selected/reported channel vectors from the receiver in different reporting intervals and may derive a final channel vector for the communication channel based on the reported channel vectors.

19 Claims, 5 Drawing Sheets

(56) References Cited

U.S. PATENT DOCUMENTS

| | | | |
|---|---|---|---|
| 2008/0130764 A1 | 6/2008 | Xia et al. | |
| 2008/0232503 A1* | 9/2008 | Kim | 375/267 |
| 2008/0304464 A1 | 12/2008 | Borkar et al. | |
| 2009/0004986 A1* | 1/2009 | Park et al. | 455/226.3 |
| 2009/0066577 A1* | 3/2009 | Kim et al. | 342/373 |

FOREIGN PATENT DOCUMENTS

| | | |
|---|---|---|
| EP | 2001138 A2 | 12/2008 |
| JP | 2008104193 A | 5/2008 |
| WO | 2005002162 A1 | 1/2005 |
| WO | WO2007050861 A2 | 5/2007 |
| WO | 2008021396 A2 | 2/2008 |
| WO | 2008050643 A1 | 5/2008 |
| WO | WO2009090618 A2 | 7/2009 |

OTHER PUBLICATIONS

Benvenuto, N., et al., "Predictive Channel Quantization and Beamformer Design for MIMO-BC with Limited Feedback", Global Telecommunications Conference, 2007. Globecom '07. IEEE, IEEE, Piscataway, NJ, USA, Nov. 1, 2007, pp. 3607-3611, XP031196613, ISBN: 978-1-4244-1042-2.

European Search Report—EP13164472—Search Authority—Munich—May 27, 2013.

NTT DOCOMO: "Multi-Codebook Pre-coding Scheme for MIMO in E-UTRA Downlink", 3GPP Draft; R1-070856 Multi-CB Precoding, 3rd Generation Partnership Project (3GPP), Mobile Competence Centre; 650, Route Des Lucioles; F-06921 Sophia-Antipolis Cedex; France, vol. RAN WG1, No. St. Louis, USA; 20070206, Feb. 6, 2007, XP050104872, [retrieved on Feb. 6, 2007].

Taiwan Search Report—TW098140439—TIPO—Jun. 14, 2013.

Texas Instruments: "Precoding Codebook Design for 4 Node-B Antenna", 3GPP Draft; R1-070730 TI Codebook 4 Ants, 3rd Generation Partnership Project (3GPP), Mobile Competence Centre; 650, Route Des Lucioles; F-06921 Sophia-Antipolis Cedex; France, vol. RAN WG1, No. St. Louis, USA; 20070206, Feb. 6, 2007, XP050104760, [retrieved on Feb. 6, 2007].

* cited by examiner

METHOD AND APPARATUS FOR CHANNEL ESTIMATION USING MULTIPLE DESCRIPTION CODES

The present application claims priority to provisional U.S. Application Ser. No. 61/142,826, entitled "METHOD AND APPARATUS FOR CHANNEL ESTIMATION USING MULTIPLE DESCRIPTION CODES," filed Jan. 6, 2009, assigned to the assignee hereof and incorporated herein by reference.

BACKGROUND

I. Field

The present disclosure relates generally to communication, and more specifically to techniques for performing channel estimation in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a transmitter may send a data transmission from multiple (K) transmit antennas to one or more (R) receive antennas at a receiver. A wireless channel between the K transmit antennas and the R receive antennas may include a propagation channel from each transmit antenna to each receive antenna. The propagation channels for all transmit and receive antennas may observe different fading and multipath effects and may be associated with different complex channel gains. Good performance may be obtained for the data transmission if an accurate estimate of the wireless channel response is available. Techniques that can provide an accurate channel estimate may thus be desirable.

SUMMARY

Techniques for using multiple description codes (MDC) for channel feedback to improve channel estimation accuracy are described herein. For channel feedback with MDC, a set of codebooks (instead of a single codebook) may be used for quantizing measured channel vectors. Each codebook may include a different set of channel vectors or codewords. Different codebooks may be selected in different reporting intervals to quantize the measured channel vectors obtained in these reporting intervals. The use of different codebooks may improve channel estimation accuracy.

In one design, a receiver may obtain an initial/measured channel vector for a communication channel. The initial channel vector may be an estimate of the response of the communication channel. The receiver may select a codebook in a set of codebooks for quantizing the initial channel vector. The receiver may then select a channel vector in the selected codebook based on the initial channel vector. For example, the receiver may select a channel vector with (i) a largest correlation with a normalized channel vector or (ii) a smallest distance to the initial channel vector. The receiver may send the selected channel vector and possibly the selected codebook to a transmitter.

In one design, the transmitter may receive a plurality of reported channel vectors sent by the receiver in a plurality of reporting intervals. Each reported channel vector may be a channel vector selected by the receiver based on an initial channel vector. The transmitter may derive a final channel vector for the communication channel based on the reported channel vectors. In one design, the transmitter may remove phase ambiguity in the reported channel vectors to obtain phase corrected channel vectors. The transmitter may then form multiple intermediate channel vectors for multiple transmit antennas at the transmitter based on the phase corrected channel vectors. Each intermediate channel vector may include channel gains for one transmit antenna in the phase corrected channel vectors. In another design, the transmitter may form each intermediate channel vector with channel gains for one transmit antenna in the reported channel vectors, without removing the phase ambiguity. For both designs, the transmitter may derive a channel gain for each transmit antenna based on (e.g., by filtering) the intermediate channel vector for that transmit antenna. The final channel vector may include multiple channel gains for the multiple transmit antennas.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies.

Figure 1:
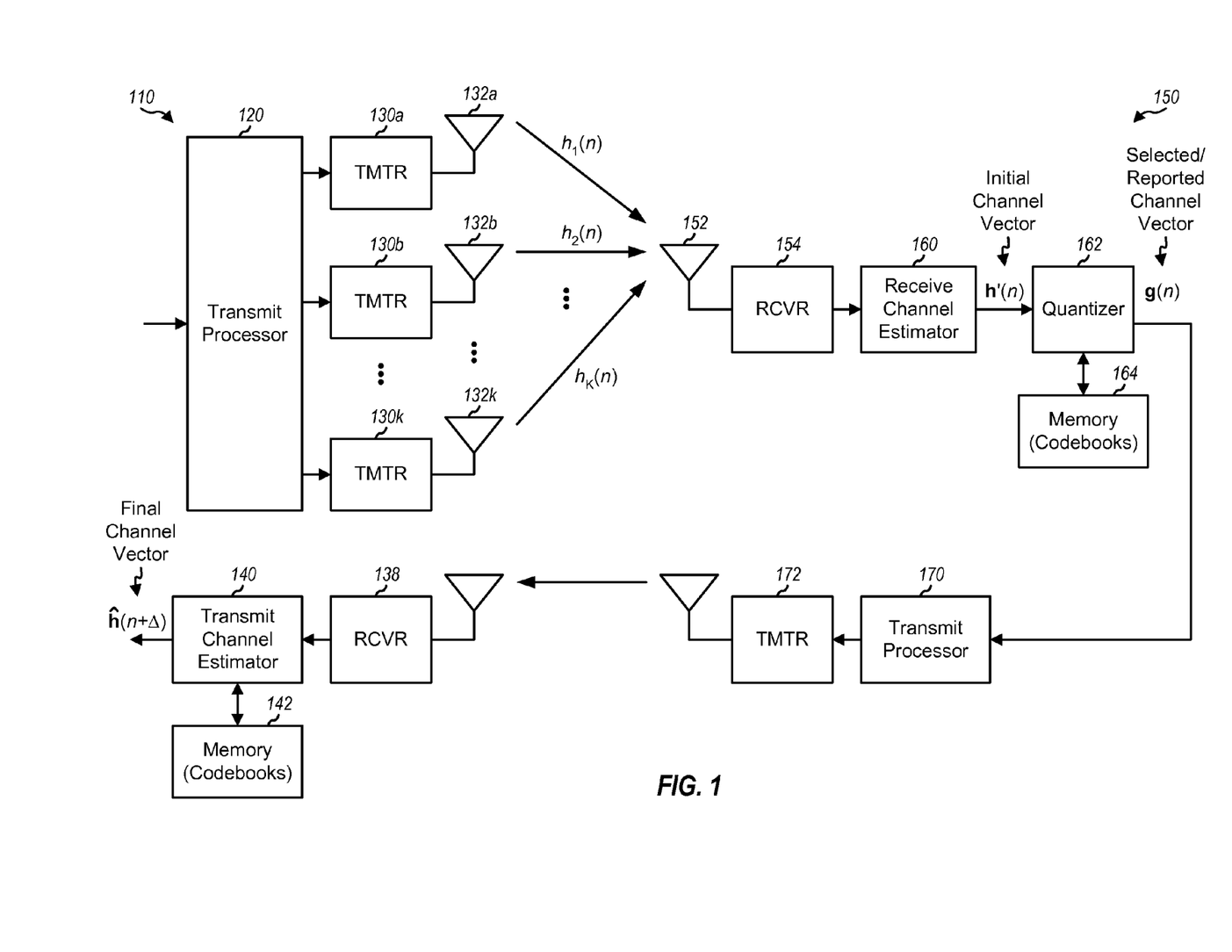
FIG. 1 shows a block diagram of a transmitter with multiple transmit antennas and a receiver with a single receive antenna.

FIG. 1 shows a block diagram of a design of a transmitter 110 and a receiver 150 in a wireless communication system. In one design, transmitter 110 may be part of a base station, receiver 150 may be part of a user equipment (UE), and a data transmission may be sent on the downlink from the base station to the UE. In another design, transmitter 110 may be part of a UE, receiver 150 may be part of a base station, and a data transmission may be sent on the uplink from the UE to the base station. Transmitter 110 and receiver 150 may also be part of other entities.

In the design shown in FIG. 1, transmitter 110 is equipped with multiple (K) transmit antennas 132a through 132k, and receiver 150 is equipped with a single receive antenna 152. A multiple-input single-output (MISO) channel is formed between the K transmit antennas 132a through 132k and the single receive antenna 152. For simplicity, the MISO channel may be assumed to be flat in frequency but correlated in time due to low user mobility. The response of the MISO channel may be denoted as:

$$h(n)=[h_1(n)\ h_2(n)\ldots h_k((n)]^T, \quad \text{Eq (1)}$$

where $h_k(n)$, for $1 \le k \le K$, is a complex channel gain between transmit antenna k and the receive antenna at time n, h(n) is a K×1 actual channel vector at time n, and "$T$" denotes a transpose.

h(n) may be a K dimensional complex Gaussian vector for the MISO channel response at time n. In general, a channel vector is a representation of the response of a communication channel. A channel vector may include channel gain information for one or more transmit antennas and one or more receive antennas.

At transmitter 110, a transmit processor 120 may generate and provide pilot symbols to K transmitter units (TMTR) 130a through 130k. The pilot symbols may be modulation symbols known a priori by transmitter 110 and receiver 150 and may also be referred to as reference symbols, training symbols, etc. Transmitter units 130a through 130k may process the pilot symbols and generate K modulated signals, which may be transmitted via antennas 132a through 132k, respectively.

At receiver 150, antenna 152 may receive the modulated signals from transmitter 110 and may provide a received signal to a receiver unit (RCVR) 154. Receiver unit 154 may process the received signal and provide received symbols to a receive channel estimator 160. Channel estimator 160 may estimate the response of the MISO channel based on the received symbols for the pilot symbols and may provide an initial channel estimate comprising an initial channel vector h'(n), which may be an estimate of the actual channel vector h(n).

Receiver 150 may quantize the K channel gains in vector h'(n) and may send the K quantized channel gains as feedback to transmitter 110. Many bits may be needed to send the K quantized channel gains. To reduce the amount of information to send back, a codebook containing M channel vectors may be defined. The M channel vectors in the codebook may be independently chosen from an isotropic distribution on a B-dimensional unit sphere, where $M=2^B$. Each channel vector may be referred to as a codeword of the codebook and may be assigned a unique B-bit index. For example, B may be equal to four, the codebook may contain 16 channel vectors, and each channel vector may be assigned a unique 4-bit index. A channel vector in the codebook that most closely matches the initial channel vector h'(n) may be selected and denoted as g(n). The B-bit index of the selected channel vector may be sent by receiver 150 to transmitter 110.

The use of a codebook to quantize the initial channel vector h'(n) may greatly reduce the amount of information to send back. However, the selected channel vector g(n) has quantization errors, which may degrade the accuracy of a channel estimate derived by transmitter 110. Quantization errors may be reduced by using a larger codebook. However, a larger codebook may result in more processing at receiver 150 to evaluate all of the codewords as well as more bits being used to convey the selected codeword.

In an aspect, multiple description codes (MDC) may be used for channel feedback. In general, MDC refers to the use of multiple code descriptions to improve the accuracy of source representation at a source. For channel feedback with MDC, different codebooks with similar statistical properties may be used in different channel feedback reporting intervals. The use of different codebooks may improve channel estimation accuracy. MDC may be used to quantize time-domain channel estimates to exploit channel correlation across time for low mobility UEs. MDC may also be used to quantize frequency-domain channel estimates (e.g., across subcarriers), which may be applicable for channels with moderate/low frequency selectivity. MDC may also be used to quantize time-frequency (2D) channel estimates. For clarity, much of the description below covers the use of MDC to quantize time-domain channel estimates.

Channel feedback with MDC may be used for both full channel feedback and channel direction feedback. For full channel feedback, both the channel norm/magnitude and direction may be fed back. A codebook for full channel feedback may include M channel vectors having different norms and directions. For channel direction feedback, a normalized channel vector $\tilde{h}(n)$ with unit norm may be obtained as follows:

$$\tilde{h}(n) = \frac{h'(n)}{\|h'(n)\|}, \quad \text{Eq (2)}$$

where $\|h'(n)\|$ denotes the magnitude of h'(n). The normalized channel vector includes channel direction information and has unit norm, so that the norm of the channel is not fed back. A codebook for channel direction feedback may include M channel vectors of unit norm.

For channel direction feedback with MDC, multiple (T) codebooks with good statistical properties may be generated. This may be achieved by selecting T best codebooks from a large set of potential codebooks such that an outage normalized correlation is maximized at a target outage probability, e.g., 0.001. The potential codebooks may be randomly generated Gaussian codebooks. Outage normalized correlation may be described as follows. A codebook G of M codewords may be denoted as $G=[g_1, \ldots, g_M]$, where $g_m$ is the m-th codeword in the codebook. An outage normalized correlation may be defined as a value such that the normalized correlation between an actual channel vector h and a reported channel vector g will be less than or equal to this value with a probability of $\alpha$, which is the outage probability. The outage normalized correlation for codebook G may be expressed as follows:

$$r_o^2(G) = \arg_\mu \left\{ P\left( \left( \max_{1 \le m \le M} |g_m^H h|^2 \right) \le \mu \|h\|^2 \right) = \alpha \right\}, \quad \text{Eq (3)}$$

where $r_\alpha^2(G)$ is the outage normalized correlation for codebook G determined as a value $\mu$ which is the solution of the equation above, $|g_m^H h|^2$ is the correlation between the actual channel vector h and the channel vector $g_m$ in the codebook, P( ) denotes a probability function, and "H" denoted a Hermetian or conjugate transpose.

The T best codebooks may be selected from the large set of potential codebooks as follows. Each potential codebook may be evaluated to determine its outage normalized correlation. For a given potential codebook $G_j$, an actual channel vector $h_i$ for a given channel realization may be correlated with each channel vector $g_m$ in the codebook, and the largest correlation may be identified and denoted as $|g_{j,max}^H h_i|^2$. A figure of merit $\mu_i$ may be computed for the channel realization as $\mu_i = |g_{j,max}^H h_i|^2 / \|h_i\|^2$. A number of channel realizations may be evaluated, and the figure of merit may be computed for each channel realization in similar manner. The value of $\mu$ such that $\alpha$ percent of the figure of merit for all channel realization is worse may be determined and provided as the outage normalized correlation for codebook $G_j$. The process may be repeated to determine the outage normalized correlation for each potential codebook. The T potential codebooks with the T highest outage normalized correlations may be selected as the T best codebooks. These T best codebooks would have the largest value of $\mu$ such that the largest correlation $$\left( \max_{1 \leq m \leq M} |g_m^H h|^2 \right)$$

is less than or equal to $\mu\|h\|^2$ with a probability of $\alpha$. The normalized correlation comes from comparing the correlation against the norm of h scaled by $\mu$. The T best codebooks may also be selected or defined in other manners.

The outage normalized correlation may be indicative of how accurate a reported channel vector is to an actual channel vector. A larger outage normalized correlation may correspond to better accuracy in the reported channel vector, and vice versa. The target outage probability may be indicative of the percentage of time the reported channel vector does not meet the outage normalized correlation. In general, a smaller target outage probability (i.e., a smaller $\alpha$) may correspond to a smaller outage normalized correlation (i.e., a smaller $\mu$), and vice versa.

The T codebooks selected for use may include different sets of channel vectors. The T codebooks may be stored in a memory 164 at receiver 150 and also in a memory 142 at transmitter 110.

At receiver 150, a quantizer 162 may obtain the initial channel vector h'(n) from channel estimator 160 and may compute a normalized channel vector $\tilde{h}(n)$, e.g., as shown in equation (2). Receiver 150 may randomly select one of the T codebooks to quantize the normalized channel vector. Receiver 150 may select the codebook such that all T codebooks are chosen equally often. Quantizer 162 may correlate the normalized channel vector against each channel vector in the selected codebook, as follows:

$$Q_m = |g_m^H \tilde{h}(n)|^2, \text{ for } 1 \leq m \leq M, \quad \text{Eq (4)}$$

where $g_m$ is the m-th channel vector in the selected codebook, and $Q_m$ is the correlation between channel vectors $\tilde{h}(n)$ and $g_m$.

From the selected codebook, quantizer 162 may select the channel vector with the largest correlation as a reported channel vector g(n), which may be the best quantized version of the normalized channel vector. In one design, quantizer 162 may provide both the index of the selected channel vector as well as the index of the selected codebook as channel feedback information. In another design, transmitter 110 may know a priori the scheme used by receiver 150 to select codebooks, and quantizer 162 may provide only the index of the selected channel vector as channel feedback information. For both designs, the channel feedback information may be processed by a transmit processor 170 and transmitted via a transmitter unit 172 to transmitter 110.

At transmitter 110, the signal from receiver 150 may be processed by a receiver unit 138 to recover the reported channel vector g(n). A transmit channel estimator 140 may receive the reported channel vector and derive a final channel estimate comprising a final channel vector $\hat{h}(n+\Delta)$ based on the L most recent reported channel vectors g(n) through g(n−L−1), where L may be any value greater than one. The final channel vector $\hat{h}(n+\Delta)$ may be an estimate of the MISO channel response at time n+Δ, where in general Δ≥0.

In one design, channel estimator 140 may first pre-process the reported channel vectors to remove phase ambiguity. The phase $\theta_i$ between the current reported channel vector g(n) and each earlier reported channel vector g(n−i) may be determined as follows:

$$\theta_i = \angle\{g^H(n) \cdot g(n-i)\}, \text{ for } 1 \leq i < L-1. \quad \text{Eq (5)}$$

The phase ambiguity of each earlier reported channel vector may be removed as follows:

$$\tilde{g}(n-i) = \exp(-j\theta_i) \cdot g(n-i), \text{ for } 1 \leq i < L-1, \quad \text{Eq (6)}$$

where $\tilde{g}(n-i)$ is a phase rotated channel vector.

The actual channel vector h(n) may include K complex channel gains $h_k(n)$, for $1 \leq k \leq K$, as shown in equation (1). An intermediate channel vector $g_k$ may be defined for each transmit antenna k as follows:

$$g_k = [g_k(n) \; g_k(n-1) \ldots g_k(n-L-1)]^T, \quad \text{Eq (7)}$$

where $g_k(n-i)$ is a complex channel gain for transmit antenna k in reported channel vector g(n−i), for 0≤i<L. The intermediate channel vector $g_k$ may include L channel gains for transmit antenna k in the L most recent reported channel vectors.

In one design, each channel gain $h_k(n)$ in the actual channel vector h(n) may be estimated independently based on the intermediate channel vector $g_k$ using a minimum mean square error (MMSE) filter. A L×L covariance matrix $R_k$ and an L×1 correlation vector $c_k$ may be defined for each transmit antenna, as follows:

$$R_k = E\{g_k \cdot g_k^H\}, \text{ and} \quad \text{Eq (8)}$$

$$c_k = E\{h^*_k(n+\Delta) \cdot g_k\}, \quad \text{Eq (9)}$$

where E{ } denotes an expectation operation and "*" denotes a complex conjugate.

In one design, the covariance matrix and the correlation vector may be calculated empirically with an assumption on the speed of a UE, which may correspond to transmitter 110 or receiver 150. For example, $g_k$ may be determined for a number of channel realizations based on a particular channel model and may be used to compute the covariance matrix and the correlation vector. In another design, the wireless channel may be assumed to have a flat Doppler power spectrum for an assumed UE speed. For both designs, the assumed UE speed may be selected to be relatively high for robustness, e.g., 5 to 10 kilometers/hour. In general, the covariance matrix and the correlation vector may be calculated (i) empirically based on a particular channel model or (ii) in real time based on the reported channel vectors.

The MMSE filter for each transmit antenna may be defined as follows:

$$w_k = R_k^{-1} \cdot c_k, \text{ for } 1 \leq k < K, \quad \text{Eq (10)}$$

where $w_k$ is the MMSE filter for transmit antenna k. Different MMSE filters may be defined for different transmit antennas based on the covariance matrices and the correlation vectors for these antennas.

The components of the final channel vector $\hat{h}(n+\Delta)$ may be determined based on the MMSE filters for the K transmit antennas, as follows:

$$\hat{h}_k(n+\Delta) = \frac{w_k^H \cdot g_k}{\|w_k^H \cdot g_k\|}, \text{ for } 1 \leq k < K, \quad \text{Eq (11)}$$

where $\hat{h}(n+\Delta) = [\hat{h}_1(n+\Delta)\, \hat{h}_2(n+\Delta) \ldots \hat{h}_K(n+\Delta)]^T$ is an estimate of the normalized actual channel vector $$\frac{h(n+\Delta)}{\|h(n+\Delta)\|}$$

at time $n+\Delta$.

The components of the final channel vector $\hat{h}(n+\Delta)$ may also be determined in other manners. For example, $\hat{h}_k(n+\Delta)$ may be obtained by averaging the L channel gains in the intermediate channel vector $g_k$.

For full channel feedback with MDC, multiple (T) codebooks with good statistical properties may be generated. This may be achieved by selecting T codebooks from a large set of potential codebooks (e.g., randomly generated Gaussian codebooks) such that an outage Euclidean distance is minimized at a target outage probability, e.g., 0.001. Outage Euclidean distance may be defined in similar manner as outage normalized correlation, except that Euclidean distance instead of normalized correlation is used as a metric. An outage Euclidean distance may be defined as a value such that the Euclidean distance between an actual channel vector h and a reported channel vector g will be less than or equal to this value with a probability of α, which is the outage probability. The T codebooks selected for use may include different sets of channel vectors.

Receiver 150 may obtain an initial channel vector h'(n) and may randomly select one of the T codebooks to quantize the initial channel vector. Receiver 150 may select the codebook such that all T codebooks are chosen equally often. Receiver 150 may compute a Euclidean distance between the initial channel vector and each channel vector in the selected codebook, as follows:

$$D_m = \sqrt{\sum_{k=1}^{K} [g_{m,k} - h'_k(n)]^2}, \text{ for } 1 \leq m < M, \quad \text{Eq (12)}$$

where $g_{m,k}$ is the k-th component in channel vector $g_m$ in the selected codebook,
 $h'_k(n)$ is the k-th channel gain in the initial channel vector h'(n), and
 $D_m$ is the Euclidean distance between channel vectors h'(n) and $g_m$.

From the selected codebook, receiver 150 may select the channel vector closest to the initial channel vector in the sense of Euclidean distance. Receiver 150 may provide the index of the selected channel vector g(n) and possibly the index of the selected codebook as channel feedback information.

Transmitter 110 may receive the reported channel vector g(n) and may derive a final channel vector $\hat{h}(n+\Delta)$ based on the L most recent reported channel vectors g(n) through g(n−L−1). For full channel feedback, transmitter 110 may omit the pre-processing to remove phase ambiguity. This step may be omitted due to the use of different methods to define the codebooks for channel direction feedback and full channel feedback. Transmitter 110 may form K intermediate channel vectors $g_k$, for $1 \leq k < K$, based on the L reported channel vectors. Transmitter 110 may then determine the channel gains in the final channel vector based on the intermediate channel vectors, e.g., using MMSE filters. The channel gains in the final channel vector may also be determined in other manners, e.g., with averaging.

Figure 2:
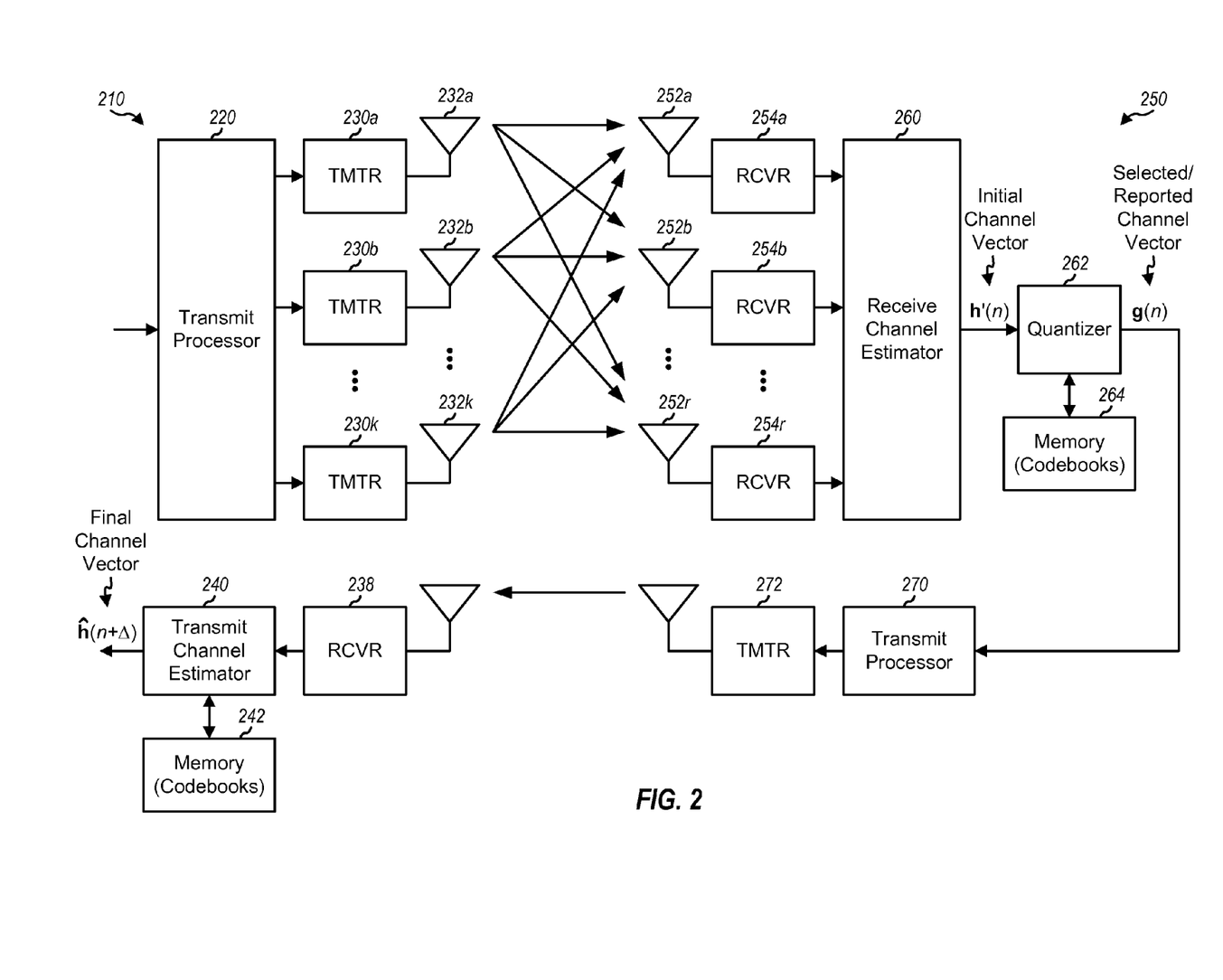
FIG. 2 shows a block diagram of a transmitter with multiple transmit antennas and a receiver with multiple receive antennas.

FIG. 2 shows a block diagram of a design of a transmitter 210 and a receiver 250 in a wireless communication system. In this design, transmitter 210 is equipped with multiple (K) transmit antennas 232a through 232k, and receiver 250 is equipped with multiple (R) receive antennas 252a through 252r. A multiple-input multiple-output (MIMO) channel is formed between the K transmit antennas 232 and the R receive antennas 252. For simplicity, the MIMO channel may be assumed to be flat in frequency but correlated in time due to low user mobility. The response of the MIMO channel may be denoted as:

$$H(n) \begin{bmatrix} h_{1,1}(n) & h_{1,2}(n) & \ldots & h_{1,K}(n) \\ h_{2,1}(n) & h_{2,2}(n) & \ldots & h_{2,K}(n) \\ \vdots & \vdots & \ddots & \vdots \\ h_{R,1}(n) & h_{R,2}(n) & \ldots & h_{R,K}(n) \end{bmatrix}, \quad \text{Eq (13)}$$

where $h_{r,k}(n)$, for $1 \leq k < K$ and $1 \leq r < R$, is a complex channel gain between transmit antenna k and receive antenna r at time n, and
 H(n) is an R×K actual channel matrix at time n.

At transmitter 210, a transmit processor 220 may generate and provide pilot symbols to K transmitter units 230a through 230k. Transmitter units 230a through 230k may process the pilot symbols and generate K modulated signals, which may be transmitted via K antennas 232a through 232k.

At receiver 250, R antennas 252a through 252r may receive the modulated signals from transmitter 210, and each antenna 252 may provide a respective received signal to an associated receiver unit 254. Each receiver unit 254 may process its received signal and provide received symbols to a receive channel estimator 260. Channel estimator 260 may estimate the response of a MIMO channel based on the received symbols for the pilot symbols and may provide an initial channel estimate comprising an initial channel matrix H'(n). The initial channel matrix H'(n) may also be represented as an initial channel vector h'(n).

A quantizer 262 may receive the initial channel matrix and perform quantization. In one design, quantizer 262 may ignore the correlation between the R receive antennas and may treat each receive antenna independently. In this design, each row of the initial channel matrix H'(n) may be treated as a separate initial channel vector $h'_r(n)$ that may be processed as described above for FIG. 1 to obtain a corresponding reported channel vector $g_r(n)$, for $1 \leq r \leq R$. Quantizer 262 may select one codebook for all R receive antennas or may select different codebooks for different receive antennas. Quantizer 262 may provide R reported channel vectors for the R receive antennas.

In another design, quantizer 262 may exploit the correlation between the R receive antennas and may treat the initial channel matrix as one long initial channel vector h'(n) of length K·R. The long initial channel vector may be processed as described above for FIG. 1 to obtain a long reported channel vector g(n).

For both designs, quantizer 262 may provide channel feedback information, which may comprise R reported channel vectors or one long reported channel vector and possibly the selected codebook(s). The channel feedback information may be processed by a transmit processor 270 and transmitted via a transmitter unit 272 to transmitter 210.

At transmitter 210, a receiver unit 238 may process the signal from receiver 250 and provide the R reported channel vectors or one long reported channel vector. A transmit channel estimator 240 may derive a final channel matrix $\hat{H}(n+\Delta)$ based on the reported channel vectors for the L most recent reporting intervals. The final channel matrix $\hat{H}(n+\Delta)$ may also be represented as a final channel vector $\hat{h}(n+\Delta)$. If R reported channel vectors $g_r(n)$, for $1 \leq r \leq R$, are sent in each reporting interval, then channel estimator 240 may derive a final channel vector $\hat{h}_r(n+\Delta)$ for each receive antenna based on the L most recent reported channel vectors $g_r(n)$ through $g_r(n-L-1)$ for that receive antenna, as described above. If one long reported channel vector g(n) is sent in each reporting interval, then channel estimator 240 may derive a final long channel vector $\hat{h}(n+\Delta)$ for all R receive antennas based on the L most recent long reported channel vectors g(n) through g(n−L−1). Channel estimator 240 may then demultiplex the final long channel vector to obtain a final channel vector $\hat{h}_r(n+\Delta)$ for each receive antenna.

In one design, a channel matrix for a MIMO channel may be converted to an equivalent channel matrix by assuming certain receiver spatial filtering/processing. For example, the channel matrix may be decomposed with singular value decomposition as follows: $H'(n)=U(n)\Lambda(n)V^H(n)$, where U(n) is a unitary matrix of left singular vectors, $\Lambda(n)$ is a diagonal matrix of singular values, and V(n) is a unitary matrix of right singular vectors. An equivalent channel matrix may be defined as: $H_{eq}(n)=U^H(n)H'(n)$. One or more columns of $H_{eq}(n)$ may be quantized using MDC and may be provided as channel feedback information. The equivalent channel matrix may also be defined in other manners, e.g., assuming other receiver spatial filtering.

The techniques described herein may allow a transmitter to derive a more accurate channel estimate based on multiple reported channel vectors for different reporting intervals. The use of different codebooks in different reporting intervals may allow a receiver to capture the channel response with different representations. These different representations may reduce quantization errors and improve accuracy when combined at the transmitter, e.g., using MMSE filters. The techniques may improve channel estimation performance, which may in turn improve data transmission performance.

Figure 3:
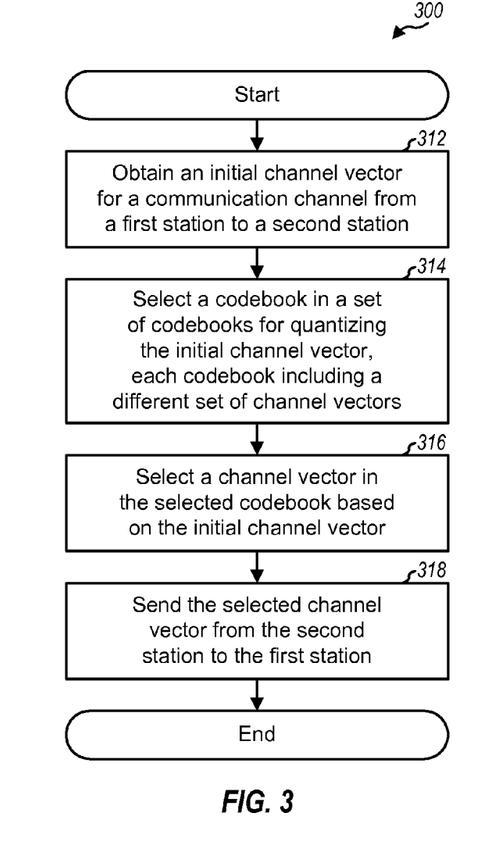
FIG. 3 shows a process for reporting channel feedback.

FIG. 3 shows a design of a process 300 for reporting channel feedback for a communication channel from a first station to a second station. Process 300 may be performed by the second station, which may be a UE, a base station, or some other entity. The second station (e.g., receiver 150 or 250) may obtain an initial channel vector (e.g., h'(n)) for the communication channel (block 312). The initial channel vector may be a time-domain channel estimate or a frequency-domain channel estimate. The second station may select a codebook in a set of codebooks for quantizing the initial channel vector (block 314). Each codebook may include a different set of channel vectors/codewords. Different codebooks may be selected in different reporting intervals, e.g., such that all codebooks are selected equally often and/or with equal probability. The second station may select a channel vector in the selected codebook based on the initial channel vector (block 316). The second station may send the selected channel vector to the first station (block 318). For example, the second station may send an index of the selected channel vector and possibly an index of the selected codebook as channel feedback information.

In one design of block 316, for channel direction feedback, each codebook may include channel vectors with different directions and unit magnitude. The set of codebooks may be defined to maximize an outage normalized correlation for a target outage probability, e.g., as described above. The second station may obtain a normalized channel vector (e.g., $\tilde{h}(n)$) based on the initial channel vector, e.g., as shown in equation (2). The second station may correlate the normalized channel vector with each channel vector in the selected codebook, e.g., as shown in equation (4). The second station may then select a channel vector with a largest correlation result among all channel vectors in the selected codebook. The selected channel vector may comprise only channel direction information.

In another design of block 316, for full channel feedback, each codebook may include channel vectors with different directions and magnitude. The set of codebooks may be defined to minimize an outage distance for a target outage probability, e.g., as described above. The second station may determine the distance (e.g., the Euclidean distance) between the initial channel vector and each channel vector in the selected codebook, e.g., as shown in equation (12). The second station may then select a channel vector with a smallest distance among all channel vectors in the selected codebook. The selected channel vector may comprise channel direction and magnitude information.

The selected channel vector may also be determined based on some other metric instead of the largest correlation or the smallest distance. In general, a metric may be computed for each channel vector in the selected codebook based on the initial channel vector. The channel vector with the best metric may be selected and reported.

In one design, the initial channel vector may be for a MISO communication channel from multiple transmit antennas at the first station to a single receive antenna at the second station, e.g., as shown in FIG. 1. In another design, the second station may be equipped with multiple receive antennas, e.g., as shown in FIG. 2. In a first design for a MIMO channel, multiple initial channel vectors (e.g., $h'_r(n)$ for $1 \leq r \leq R$) may be obtained for the multiple receive antennas. The second station may obtain at least one additional initial channel vector for at least one additional receive antenna. The second station may select at least one channel vector in the selected codebook (or at least one other selected codebook) based on the at least one additional initial channel vector. The second station may then send all selected channel vectors to the first station.

In a second design for a MIMO channel, a single initial channel vector may be obtained for the multiple receive antennas. The second station may obtain multiple shorter initial channel vectors (e.g., $h'_r(n)$ for $1 \leq r \leq R$) for the multiple receive antennas, one shorter initial channel vector for each receive antenna. The second station may form the initial channel vector (e.g., h'(n)) for all receive antennas based on the multiple shorter initial channel vectors. The second station may derive the final channel vector for all receive antennas based on the initial channel vector.

In a third design for a MIMO channel, the second station may obtain multiple initial channel vectors for the multiple receive antennas, one initial channel vector for each receive antenna. The second station may derive an equivalent channel matrix based on the multiple initial channel vectors and a particular receiver spatial filter. The second station may select at least one channel vector in the selected codebook based on at least one vector in the equivalent channel matrix. The second station may then send the at least one selected channel vector to the first station.

Figure 4:
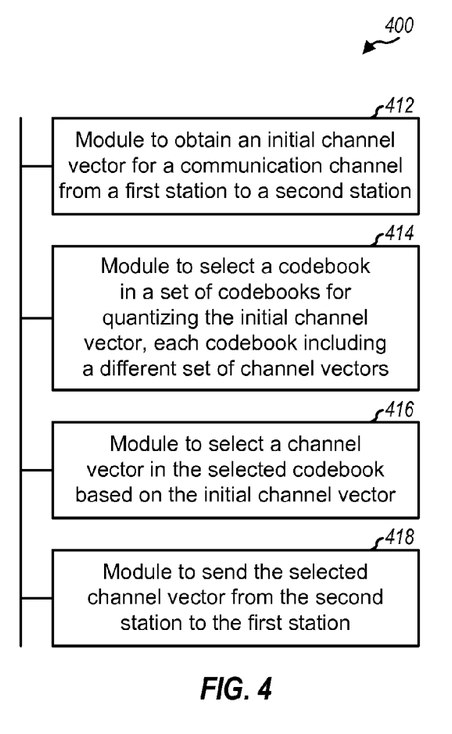
FIG. 4 shows an apparatus for reporting channel feedback.

FIG. 4 shows a design of an apparatus 400 for reporting channel feedback. Apparatus 400 includes a module 412 to obtain an initial channel vector for a communication channel from a first station to a second station, a module 414 to select a codebook in a set of codebooks for quantizing the initial channel vector, each codebook including a different set of channel vectors, a module 416 to select a channel vector in the selected codebook based on the initial channel vector, and a module 418 to send the selected channel vector from the second station to the first station.

Figure 5:
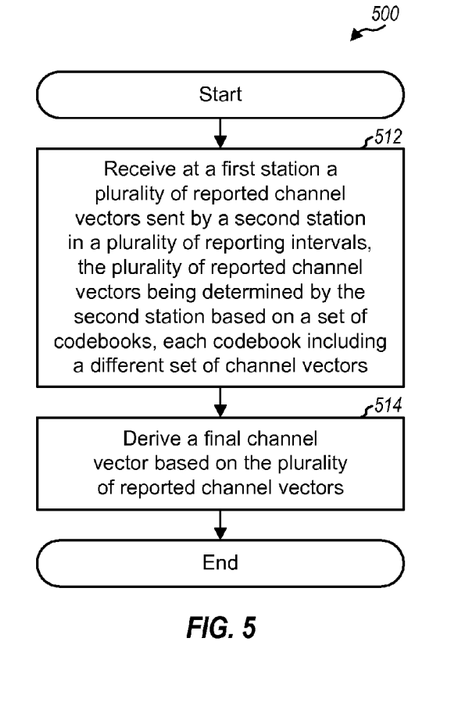
FIG. 5 shows a process for performing channel estimation.

FIG. 5 shows a design of a process 500 for performing channel estimation for a communication channel from a first station to a second station. Process 500 may be performed by the first station, which may be a base station, a UE, or some other entity. The first station (e.g., transmitter 110 or 210) may receive a plurality of reported channel vectors (e.g., g(n) through g(n−L−1)) sent by the second station in a plurality of reporting intervals (block 512). The plurality of reported channel vectors may be determined by the second station based on a set of codebooks, with each codebook including a different set of channel vectors/codewords. The first station may derive a final channel vector (e.g., ĥ(n+Δ)) for the communication channel based on the plurality of reported channel vectors (block 514).

In one design of block 514, for channel direction feedback, each reported channel vector may include channel direction information and may have unit magnitude. The first station may remove phase ambiguity in the plurality of reported channel vectors to obtain a plurality of phase corrected channel vectors, e.g., as shown in equation (6). The first station may form multiple intermediate channel vectors (e.g., $g_k$) for multiple transmit antennas at the first station based on the plurality of phase corrected channel vectors, e.g., as shown in equation (7). Each intermediate channel vector may include channel gains for one transmit antenna in the plurality of phase corrected channel vectors. In another design, for full channel feedback, each reported channel vector may include channel direction and magnitude information. The first station may form each intermediate channel vector with channel gains for one transmit antenna in the plurality of reported channel vectors.

For both channel direction feedback and full channel feedback, the first station may derive a channel gain for each transmit antenna based on the intermediate channel vector for that transmit antenna. In one design, the first station may filter the intermediate channel vector for each transmit antenna with an MMSE filter to obtain the channel gain for that transmit antenna, e.g., as shown in equation (11). The first station may determine a covariance matrix and a correlation vector for each transmit antenna, e.g., as shown in equations (8) and (9). The first station may then determine an MMSE filter for each transmit antenna based on the covariance matrix and the correlation vector for that transmit antenna, e.g., as shown in equation (10). In another design, the first station may average the intermediate channel vector for each transmit antenna to obtain the channel gain for that transmit antenna. In any case, the final channel vector may include multiple channel gains for the multiple transmit antennas at the first station.

In one design, the first station may receive one reported channel vector in each reporting interval for a MISO channel from the multiple transmit antennas at the first station to a single receive antenna at the second station. In another design, the first station may receive multiple reported channel vectors in each reporting interval for a MIMO channel from the multiple transmit antennas at the first station to multiple receive antennas at the second station. The first station may receive one reported channel vector for each receive antenna. The first station may derive multiple final channel vectors for the multiple receive antennas. Each final channel vector may be for a different receive antenna and may be derived based on the reported channel vectors for that receive antenna. Alternatively, the first station may receive one reported channel vector in each reporting interval for the MIMO channel. This reported channel vector may be obtained by the second station by concatenating smaller initial channel vectors for the multiple antennas at the second station. The first station may derive one final channel vector for the multiple receive antennas and may demultiplex this final channel vector to obtain multiple smaller final channel vectors for the multiple receive antennas.

Figure 6:
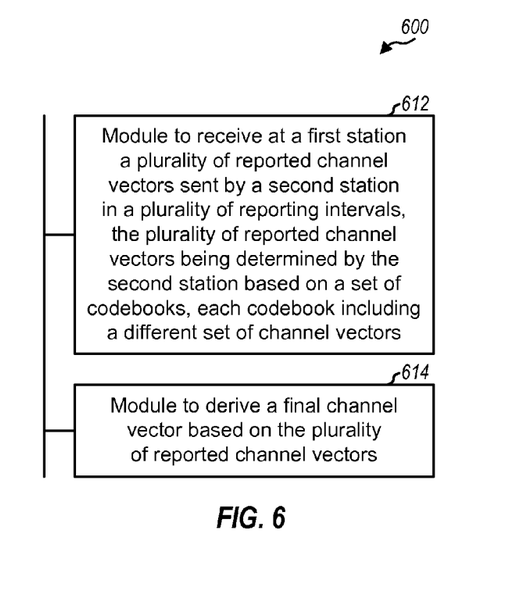
FIG. 6 shows an apparatus for performing channel estimation.

FIG. 6 shows a design of an apparatus 600 for performing channel estimation. Apparatus 600 includes a module 612 to receive at a first station a plurality of reported channel vectors sent by a second station in a plurality of reporting intervals, the plurality of reported channel vectors being determined by the second station based on a set of codebooks, each codebook including a different set of channel vectors, and a module 612 to derive a final channel vector based on the plurality of reported channel vectors.

The modules in FIGS. 4 and 6 may comprise processors, electronics devices, hardware devices, electronics components, logical circuits, memories, software codes, firmware codes, etc., or any combination thereof.

Figure 7:
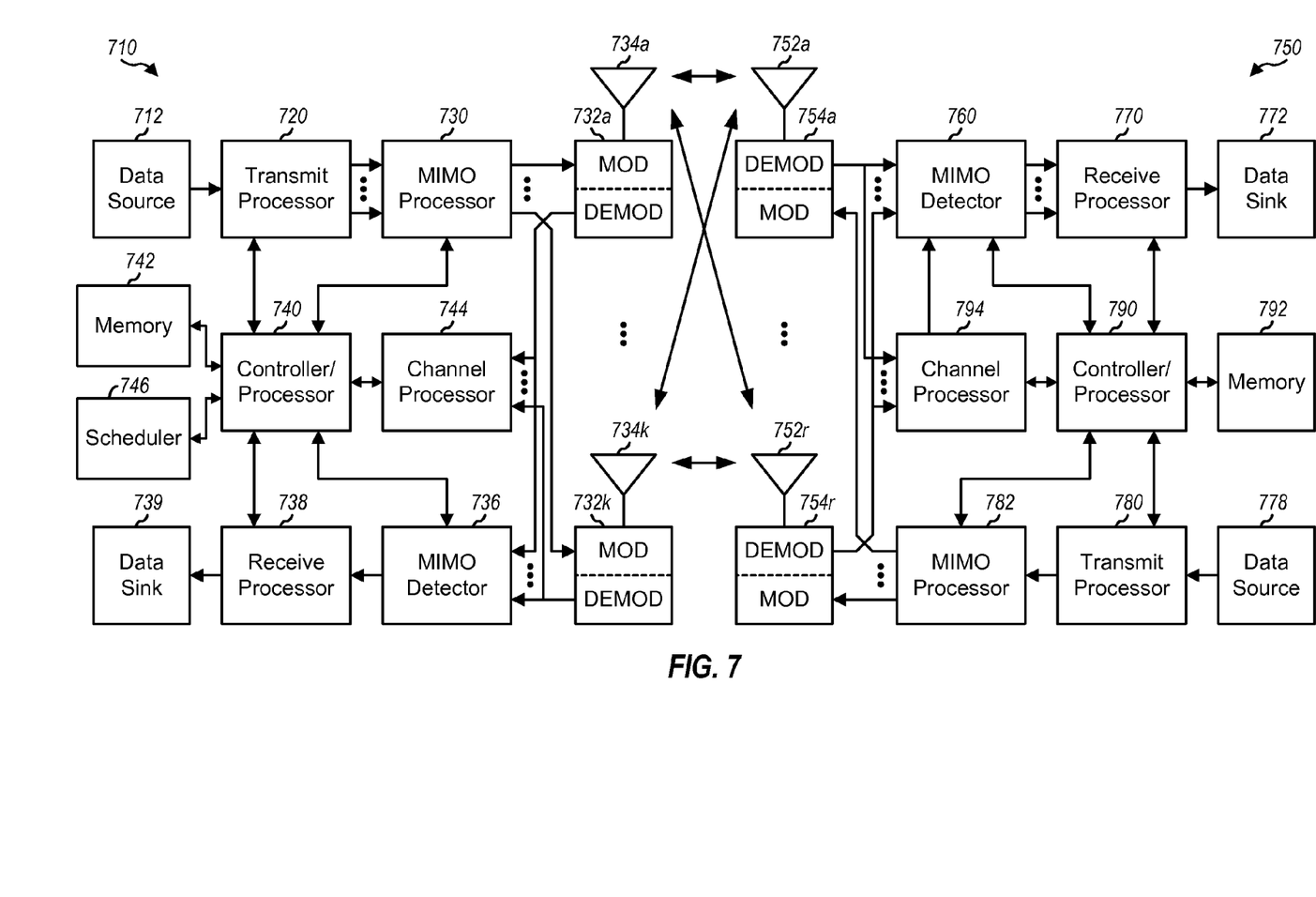
FIG. 7 shows a block diagram of a base station and a UE.

FIG. 7 shows a block diagram of a design of a base station 710 and a UE 750. A base station may also be referred to as a Node B, an evolved Node B (eNB), an access point, etc. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. In the design shown in FIG. 7, base station 710 is equipped with K antennas 734a through 734k, and UE 750 is equipped with R antennas 752a through 752r, where in general K≥1 and R≥1.

At base station 710, a transmit processor 720 may receive data for one or more UEs from a data source 712, process (e.g., encode and modulate) the data for each UE based on one or more modulation and coding schemes for that UE, and provide data symbols for all UEs. Transmit processor 720 may also generate control symbols for control information. Transmit processor 720 may further generate reference/pilot symbols for one or more reference signals. A MIMO processor 730 may perform precoding on the data symbols, the control symbols, and/or the reference symbols, if applicable, and may provide K output symbol streams to K modulators (MOD) 732a through 732k. Each modulator 732 may process its output symbol stream (e.g., for OFDM) to obtain an output sample stream. Each modulator 732 may further condition (e.g., convert to analog, filter, amplify, and upconvert) its output sample stream and generate a downlink signal. K downlink signals from modulators 732a through 732k may be transmitted via antennas 734a through 734k, respectively.

At UE 750, R antennas 752a through 752r may receive the K downlink signals from base station 710, and each antenna 752 may provide a received signal to an associated demodulator (DEMOD) 754. Each demodulator 754 may condition (e.g., filter, amplify, downconvert, and digitize) its received signal to obtain samples and may further process the samples (e.g., for OFDM) to obtain received symbols. Each demodulator 754 may provide received data symbols to a MIMO detector 760 and provide received reference symbols to a channel processor 794. Channel processor 794 may estimate the response of the downlink channel from base station 710 to UE 750 based on the received reference symbols and may provide a channel estimate to MIMO detector 760. MIMO detector 760 may perform MIMO detection on the received data symbols based on the channel estimate and provide symbol estimates, which may be estimates of the transmitted symbols. A receive processor 770 may process (e.g., demodulate and decode) the symbol estimates based on the modulation and coding scheme(s) used for UE 750, provide decoded data to a data sink 772, and provide decoded control information to a controller/processor 790.

UE 750 may estimate the downlink channel response and generate channel feedback information, which may comprise reported channel vectors. UE 750 may also estimate the downlink channel quality and determine channel quality indicator (CQI) information. Feedback information (e.g., the channel feedback information, CQI information, etc.), data from a data source 778, and a reference signal may be processed (e.g., encoded and modulated) by a transmit processor 780, precoded by a MIMO processor 782, if applicable, and further processed by modulators 754a through 754r to generate R uplink signals, which may be transmitted via antennas 752a through 752r. At base station 710, the R uplink signals from UE 750 may be received by K antennas 734a through 734k and processed by demodulators 732a through 732k. A channel processor 744 may estimate the response of the uplink channel from UE 750 to base station 710 and may provide a channel estimate to MIMO detector 736. MIMO detector 736 may perform MIMO detection based on the channel estimate and provide symbol estimates. A receive processor 738 may process the symbol estimates, provide decoded data to a data sink 739, and provide decoded feedback information to a controller/processor 740. Controller/processor 740 may control data transmission to UE 750 based on the feedback information.

Controllers/processors 740 and 790 may direct the operation at base station 710 and UE 750, respectively. Processor 794, processor 790 and/or other processors and modules at UE 750 may perform or direct process 300 in FIG. 3, process 500 in FIG. 5, and/or other processes for the techniques described herein. Processor 744, processor 740 and/or other processors and modules at base station 710 may also perform or direct process 300 in FIG. 3, process 500 in FIG. 5, and/or other processes for the techniques described herein. Memories 742 and 792 may store data and program codes for base station 710 and UE 750, respectively. A scheduler 746 may select UE 750 and/or other UEs for data transmission on the downlink and/or uplink based on the feedback information received from the UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of reporting channel feedback information, comprising:
    obtaining an initial channel vector for a communication channel from a first station to a second station;
    selecting a codebook in a set of codebooks for quantizing the initial channel vector, each codebook including a different set of channel vectors, wherein different codebooks in the set of codebooks are selected in different reporting intervals;
    selecting a channel vector in the selected codebook based on the initial channel vector; and
    sending the selected channel vector from the second station to the first station.

2. The method of claim 1, wherein the selecting a channel vector in the selected codebook comprises
    obtaining a normalized channel vector based on the initial channel vector, correlating
    the normalized channel vector with each channel vector in the selected codebook, and
    selecting a channel vector with a largest correlation result among all channel vectors in the selected codebook.

3. The method of claim 1, wherein the selecting a channel vector in the selected codebook comprises
    determining distance between the initial channel vector and each channel vector in the selected codebook, and
    selecting a channel vector with a smallest distance among all channel vectors in the selected codebook.

4. The method of claim 1, wherein the initial channel vector is for one receive antenna at the second station, the method further comprising:
    obtaining at least one additional initial channel vector for at least one additional receive antenna at the second station;
    selecting at least one channel vector in the selected codebook based on the at least one additional initial channel vector; and
    sending all selected channel vectors from the second station to the first station.

5. The method of claim 1, further comprising:
    obtaining multiple shorter initial channel vectors for multiple receive antennas at the second station, one shorter initial channel vector for each receive antenna; and
    forming the initial channel vector based on the multiple shorter initial channel vectors.

6. The method of claim 1, further comprising:
    obtaining multiple initial channel vectors for multiple receive antennas at the second station, wherein the initial channel vector is for one receive antenna;
    deriving an equivalent channel matrix based on the multiple initial channel vectors and a particular receiver spatial filter;
    selecting at least one channel vector in the selected codebook based on at least one vector in the equivalent channel matrix; and
    sending the at least one selected channel vector from the second station to the first station, wherein the selected channel vector is one of the at least one selected channel vector.

7. The method of claim 1, wherein each codebook includes channel vectors with different directions and unit magnitude.

8. The method of claim 1, wherein each codebook includes channel vectors with different directions and magnitude.

9. An apparatus for reporting channel feedback information, comprising:
    means for obtaining an initial channel vector for a communication channel from a first station to a second station;
    means for selecting a codebook in a set of codebooks for quantizing the initial channel vector, each codebook including a different set of channel vector, wherein different codebooks in the set of codebooks are selected in different reporting intervals;
    means for selecting a channel vector in the selected codebook based on the initial channel vector; and
    means for sending the selected channel vector from the second station to the first station.

10. The apparatus of claim 9, wherein the means for selecting a channel vector in the selected codebook comprises
    means for obtaining a normalized channel vector based on the initial channel vector,
    means for correlating the normalized channel vector with each channel vector in the selected codebook, and
    means for selecting a channel vector with a largest correlation result among all channel vectors in the selected codebook.

11. The apparatus of claim 9, wherein the means for selecting a channel vector in the selected codebook comprises
    means for determining distance between the initial channel vector and each channel vector in the selected codebook, and
    means for selecting a channel vector with a smallest distance among all channel vectors in the selected codebook.

12. The apparatus of claim 9, wherein the initial channel vector is for one receive antenna at the second station, the apparatus further comprising:
    means for obtaining at least one additional initial channel vector for at least one additional receive antenna at the second station;
    means for selecting at least one channel vector in the selected codebook based on the at least one additional initial channel vector; and
    means for sending all selected channel vectors from the second station to the first station.

13. The apparatus of claim 9, further comprising:
    means for obtaining multiple shorter initial channel vectors for multiple receive antennas at the second station, one shorter initial channel vector for each receive antenna; and
    means for forming the initial channel vector based on the multiple shorter initial channel vectors.

14. An apparatus for reporting channel feedback information, comprising:
    at least one processor configured to obtain an initial channel vector for a communication channel from a first station to a second station, to select a codebook in a set of codebooks for quantizing the initial channel vector, each codebook including a different set of channel vectors, to select a channel vector in the selected codebook based on the initial channel vector, and to send the selected channel vector from the second station to the first station, wherein different codebooks in the set of codebooks are selected in different reporting intervals.

15. The apparatus of claim 14, wherein the at least one processor is configured to obtain a normalized channel vector based on the initial channel vector, to correlate the normalized channel vector with each channel vector in the selected codebook, and to select a channel vector with a largest correlation result among all channel vectors in the selected codebook.

16. The apparatus of claim 14, wherein the at least one processor is configured to determine distance between the initial channel vector and each channel vector in the selected codebook, and to select a channel vector with a smallest distance among all channel vectors in the selected codebook.

17. The apparatus of claim 14, wherein the initial channel vector is for one receive antenna at the second station, and wherein the at least one processor is configured to obtain at least one additional initial channel vector for at least one additional receive antenna at the second station, to select at least one channel vector in the selected codebook based on the at least one additional initial channel vector, and to send all selected channel vectors from the second station to the first station.

18. The apparatus of claim 14, wherein the at least one processor is configured to obtain multiple shorter initial channel vectors for multiple receive antennas at the second station, one shorter initial channel vector for each receive antenna, and to form the initial channel vector based on the multiple shorter initial channel vectors.

19. A computer program product, comprising:

a non-transitory computer-readable medium comprising:

code for causing at least one computer to obtain an initial channel vector for a communication channel from a first station to a second station, code for causing the at least one computer to select a codebook in a set of codebooks for quantizing the initial channel vector, each codebook including a different set of channel vectors, wherein different codebooks in the set of codebooks are selected in different reporting intervals, code for causing the at least one computer to select a channel vector in the selected codebook based on the initial channel vector, and code for causing the at least one computer to send the selected channel vector from the second station to the first station.

\* \* \* \* \*